United States Patent
Torigoe et al.

(10) Patent No.: US 6,548,161 B1
(45) Date of Patent: *Apr. 15, 2003

(54) HIGH TEMPERATURE EQUIPMENT

(75) Inventors: Taiji Torigoe, Takasago (JP); Hisataka Kawai, Takasago (JP); Yukiko Nishiura, Takasago (JP); Koji Takahashi, Takasago (JP); Katsuhiko Abe, Takasago (JP)

(73) Assignee: Mitsubishi Heavy Industries, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,349

(22) Filed: May 18, 1999

(30) Foreign Application Priority Data

May 28, 1998 (JP) .................................... 10-162781

(51) Int. Cl.$^7$ .............................................. B32B 91/00

(52) U.S. Cl. ........................ 428/332; 428/472; 428/698

(58) Field of Search ................. 428/697, 699, 428/698, 332, 472

(56) References Cited

U.S. PATENT DOCUMENTS

| 4,275,090 A | * | 6/1981 | McComas et al. ............. 427/34 |
| 4,275,124 A | * | 6/1981 | McComas et al. ........... 428/564 |
| 4,666,733 A | | 5/1987 | Wlodek |
| 5,079,100 A | * | 1/1992 | Descamp et al. ........... 428/552 |
| 5,141,821 A | * | 8/1992 | Lugscheider et al. ....... 428/614 |
| 5,652,028 A | * | 7/1997 | Taylor et al. ............... 427/451 |

FOREIGN PATENT DOCUMENTS

| EP | 0401611 | 12/1990 |
| EP | 0589072 | 3/1994 |
| GB | 2006274 | 5/1979 |
| GB | 2063305 | 6/1981 |
| JP | 7-269614 | 10/1995 |
| JP | 10-71454 | 3/1998 |
| JP | 11-80920 | 3/1999 |

* cited by examiner

Primary Examiner—Archene Turner
(74) Attorney, Agent, or Firm—Wenderoth, Lind & Ponack, L.L.P.

(57) ABSTRACT

Provided is high temperature equipment, such as gas turbine high temperature portion, usable in high temperature corrosion environment due to corrosive components and in erosion environment due to flying particles. Coating layer (2) in which $Cr_3C_2$ is finely dispersed in matrix MCrAlY, where weight ratio of MCrAlY/$Cr_3C_2$ is 1/1 to 3/1, is formed on base material (1) as sprayed coating and then diffusion heat treatment is added.

4 Claims, 4 Drawing Sheets

Cross sectional microstructure of coating according to the present invention (White phase (11μm maximum) is a finely dispersed $Cr_3C_2$)

(×100)

(×500)

Cross sectional microstructure of coating according to the present invention (White phase (11μm maximum) is a finely dispersed $Cr_3C_2$)

Note: Alumina particle size: φ 1mm
Test temperature: 700° C

HIGH TEMPERATURE EQUIPMENT

BACKGROUND OF THE INVENTION

1. Field of the Invention

The present invention relates to a high temperature equipment which is usable in a high temperature corrosion environment due to corrosive components as well as in an erosion environment due to flying particles.

2. Description of the Prior Art

Taking example of a gas turbine, it is a recent tendency that a low quality fuel is going to be used for cost reduction of gas turbine operation. Of the low quality fuel, in a turbine operated by fuel obtained by coal gasification at a pressurized fluidized bed boiler, as compared with natural gas fuel or oil fuel as so far been used, there are produced a severe high temperature corrosion environment due to corrosive components of Na, K, Cl, S, etc. as well as an extremely severe erosion environment due to flying particles.

Thus, in order to enhance the corrosion resistance in a high temperature portion of the gas turbine using fuel obtained by coal gasification at the pressurized fluidized bed boiler, especially in a turbine moving/stationary blade used in a severe operation condition, there is employed an element having an aluminum diffusion layer formed thereon by an aluminum diffusion coating, as shown in FIG. 4(a), or an element having a spray coating of MCrAlY (M: Co, Ni, Co+Ni, Fe) formed thereon, as shown in FIG. 4(b). But, essentially with respect to these coatings, main object thereof is a corrosion resistance and reduction of erosion due to flying particles is a secondary one.

Also, as shown in FIG. 4(c), there is often used a spray coating of chromium carbide [75 wt % $Cr_3C_2$–25 wt % (50 wt % Ni–50 wt % Cr)] as an erosion resistant coating for steam generator tube and the like which are under an erosion environment.

However, while this spray coating of chromium carbide is excellent in the erosion resistance by virtue of the finely dispersed $Cr_3C_2$, quantity of matrix (binding material) contained therein is small and from view point of its ductility and toughness, it is not used for turbine blade which is a rotational element.

Another reason for being not used for the turbine blade is that Ni—Cr alloy of the matrix is inferior to the MCrAlY coating in the corrosion resistance and oxidation resistance in a high temperature. Thus, in the prior art gas turbine moving/stationary blade used in such a severe environment, there arises a problem that life of the turbine blade is shortened extremely. It is to be noted that the temperature of damageable portion in such a case is approximately 600 to 800° C.

SUMMARY OF THE INVENTION

In view of the problem in the prior art, therefore, it is an object of the present invention to provide a high temperature equipment, such as a gas turbine high temperature portion, which is usable in a high temperature corrosion environment due to corrosive components as well as in an erosion environment due to flying particles.

In order to attain said object, the present invention provides a high temperature equipment whose base material 1 has a coating layer formed thereon in which $Cr_3C_2$ which is excellent in a high temperature erosion resistance is finely dispersed in a matrix MCrAlY which is excellent in a corrosion resistance and oxidation resistance, as shown in a schematic cross sectional view of FIG. 1, so that life of a high temperature portion of turbine blade, steam generator tube and the like may be elongated.

The MCrAlY is a generally used one for the corrosion resistant and oxidation resistant coating and representative ones thereof are shown in Table 1 together with chemical compositions.

TABLE 1

|  | Co | Ni | Fe | Cr | Al | Y |
|---|---|---|---|---|---|---|
| CoNiCrAlY | Remainder | 32 | 0 | 22 | 8 | 0.5 |
| CoCrAlY | Remainder | 0 | 0 | 29 | 5.8 | 0.4 |
| NiCrAlY | 0 | Remainder | 0 | 31.5 | 12 | 0.8 |
| FeCrAlY | 0 | 0 | Remainder | 24 | 8 | 0.5 |

Mixing ratio of MCrAlY to $Cr_3C_2$ is (50~75):(50~25) in weight ratio, that is, MCrAlY/$Cr_3C_2$=1/1~3/1. This is for the reason that if ratio of $Cr_3C_2$ is less than 25%, effect of the erosion resistance becomes low and if ratio of $Cr_3C_2$ is beyond 50%, toughness of the coating, when used for a rotational element, becomes low to crack easily.

In working the coating layer of the present invention, like in the case of conventional MCrAlY, there can be used various spraying methods, such as a low pressure plasma spraying (LPPS), an atmospheric pressure plasma spraying (APS), a high speed flame spraying (HVOF) and the like. Spray powder is made such that MCrAlY powder is mixed with $Cr_3C_2$ powder sufficiently at a ball mill and then is classified to each particle size distribution which is appropriate for the kind of spraying work.

The powder particle size distribution is classified according to the particle size distribution generally specified by the respective spraying apparatus manufactures. That is, the particle size distribution of 45 μm or less is used for LPPS, that of 45 to 106 μm is used for APS and that of 16 53 μm is used for HVOF.

BRIEF DESCRIPTION OF THE DRAWINGS

FIG. 2 is a photograph showing a cross sectional microstructure of a coating in the high temperature equipment of FIG. 1, wherein

FIG. 4 is an explanatory view showing cross sectional structures of the high temperature equipment in the prior art, wherein

DESCRIPTION OF THE PREFERRED EMBODIMENTS

Figure 1:
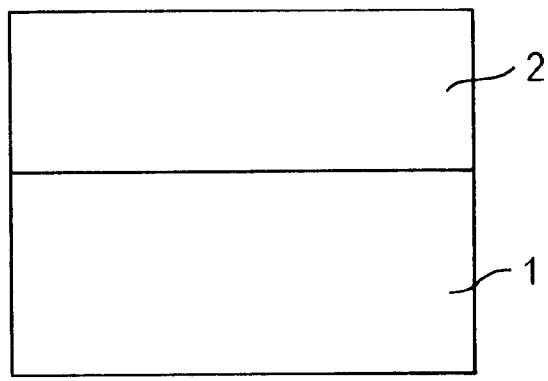
FIG. 1 is a cross sectional view showing structure of a high temperature equipment of one embodiment according to the present invention.

Herebelow, description will be made concretely on a high temperature equipment of an embodiment according to the present invention. As shown in FIG. 1, a base material 1 (X-45: Tradename: Co radial alloy, Co-11Ni-25.5 Cr-7W-

2Fe-0.25C) has a coating layer 2 formed thereon, said coating layer being formed so as to have both a corrosion/oxidation resistance and an erosion resistance.

As a coating material, used is CoNiCrAlY (Co-32Ni-21Cr-8Al-0.5Y), which is considered a most suitable one of the MCrAlY and is mixed with $Cr_3C_2$ in a ratio of 50 wt %:50 wt % and 75 wt %:25 wt %, respectively. It is to be noted that the coating powder is made of CoNiCrAlY powder mixed with $Cr_3C_2$ powder sufficiently at a ball mill and is classified to the particle size distribution of 45 μm or less which is appropriate for LPPS.

Firstly, the base material X-45 is applied to its surface by a grid blast treatment using $Al_2O_3$ grains so that the surface of the base material is made in an appropriate state for plasma spraying. Then, CoNiCrAlY+$Cr_3C_2$ as sample No. 1 is sprayed by the LPPS method. Thickness of the coating is 0.2 mm.

Also, as sample No. 2, chromium carbide coating [75 wt % $Cr_3C_2$–25 wt % (50 wt % Ni–50 wt % Cr)] is sprayed by the APS method, said chromium carbide coating being often used in the prior art as a high temperature erosion resistant coating for steam generator tube and the like. Particle size distribution of the spray powder is classified to the particle size distribution of 45 to 106 μm which is appropriate for APS. Thickness of the coating is 0.2 mm.

Further, as sample No. 3, CoNiCrAlY coating is sprayed by the LPPS method, said CoNiCrAlY coating being used in the prior art as a corrosion resistant and oxidation resistant coating. Particle size distribution of the spray powder is classified to the particle size distribution of 44 μm or less which is appropriate for LPPS. Thickness of the coating is 0.2 mm. Structures of these samples No. 1 to No. 3 are shown in Table 2.

TABLE 2

| Sample Nos. | Base material | Coating material | Coating thickness (mm) |
|---|---|---|---|
| 1 (Invented coating) | X-45 | 50% $Cr_3C_2$ + 50% CoNiCrAlY<br>25% $Cr_3C_2$ + 75% CoNiCrAlY | 0.2<br>0.2 |
| 2 (Prior art coating) | X-45 | 75% $Cr_3C_2$ + 25% NiCr | 0.2 |
| 3 (Prior art coating) | X-45 | CoNiCrAlY | 0.2 |

Figure 2A:
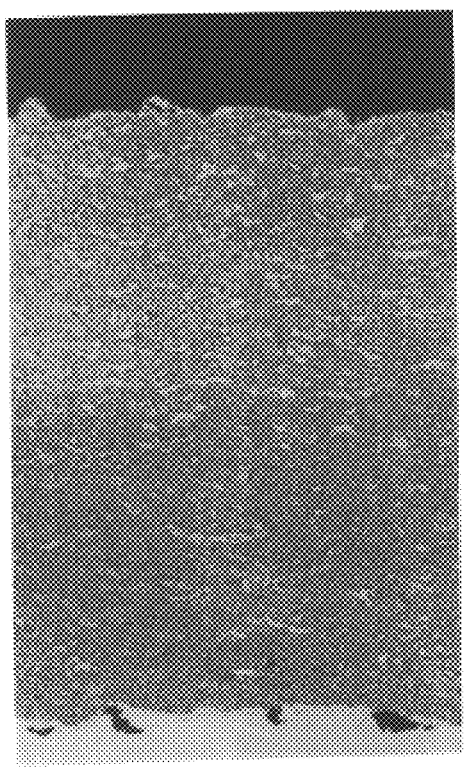
FIG. 2(a) is of a 100 multiple and FIG. 2(b) is of a 500 multiple.
Figure 2B:
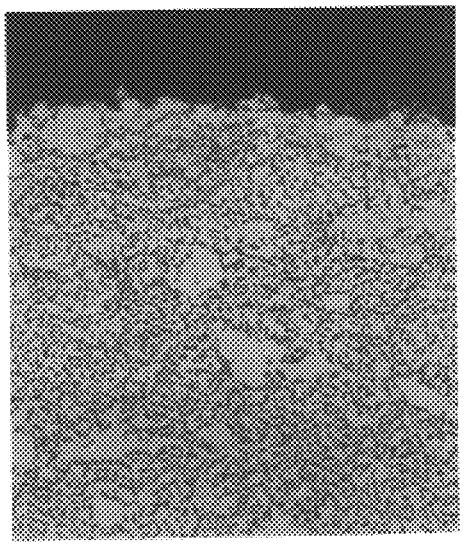

Finally, in order to enhance a bonding strength of the corrosion resistant and erosion resistant coating, a vacuum heat treatment ( $10^{-3} \sim 10^{-4}$ Torr) of heating temperature of 1,000° C. and heating time of 2 hours as a diffusion heat treatment is applied to the respective test pieces. A representative photograph of the cross sectional microstructure of the sample No. 1 after heat treated is shown in FIG. 2, from which it is found that $Cr_3C_2$ of white color of particle size of 2~11 μm is finely dispersed in the CoNiCrAlY matrix.

Using the mentioned test pieces, oxidation test, corrosion test and erosion test have been done for evaluation.

For the oxidation test, heating (700° C.×1000 Hr) in a furnace in the atmosphere is done and after the test, cross sectional microstructure is observed for evaluation of oxidation state of the coating layer and coating thickness still remaining.

For the corrosion test, molten salt (80% $Na_2SO_4$+20% NaCl) spreading method is employed and where one cycle is 700° C.×20 Hr, 10 cycles thereof are repeated. After the test, cross sectional microstructure is observed for evaluation of corrosion state of the coating layer and coating thickness still remaining.

Figure 3:
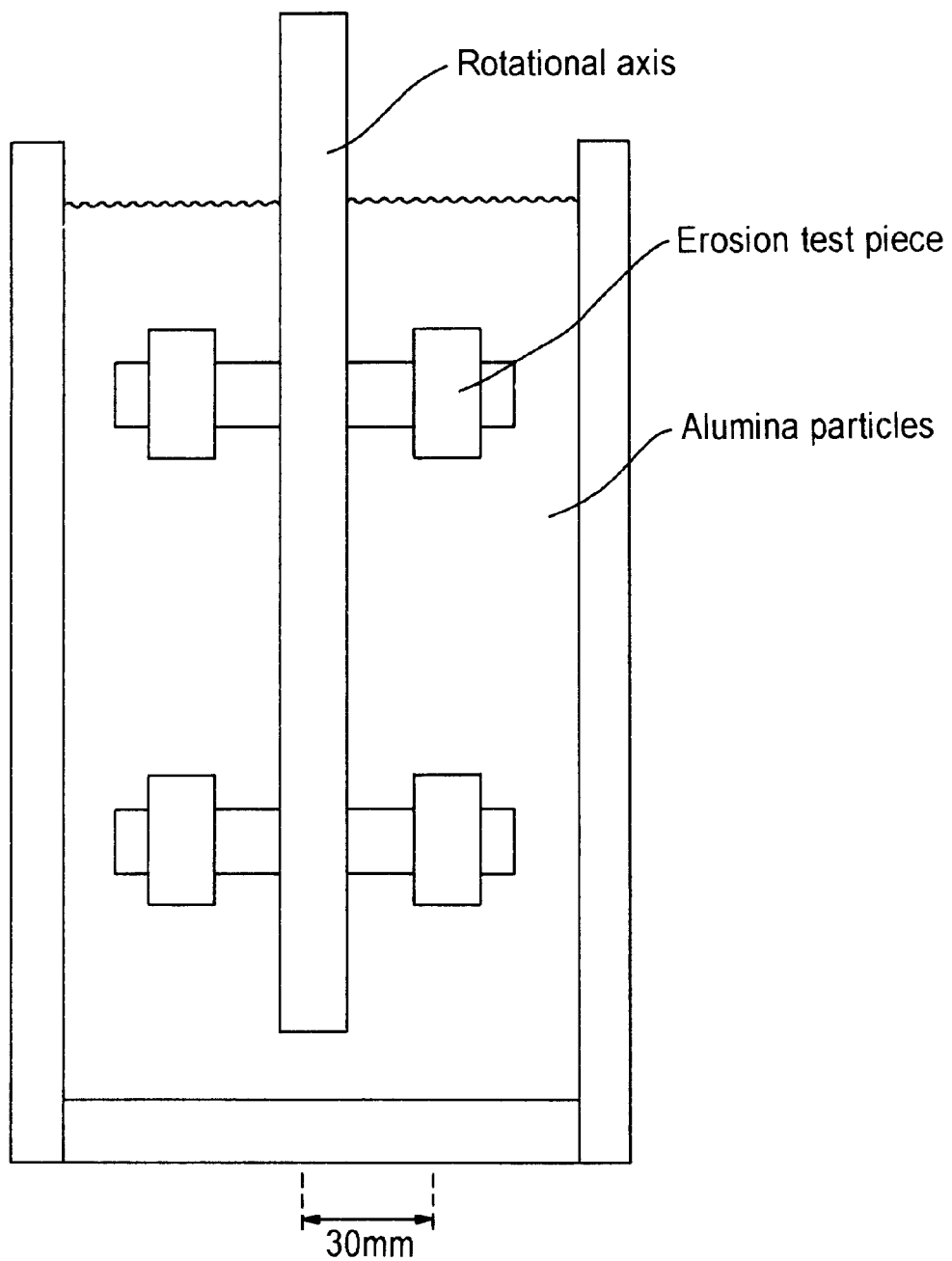
FIG. 3 is an explanatory view showing an erosion test apparatus used for evaluation of erosion characteristic of the high temperature equipment.
Figure 4A:
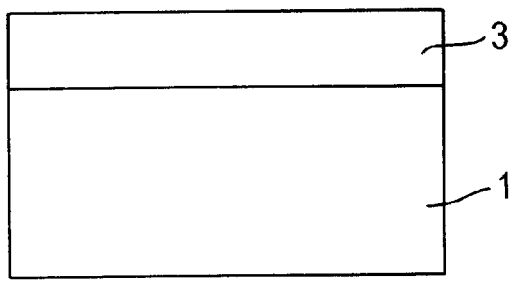
FIG. 4(a) shows a structure having diffusion layer of Al.
Figure 4B:
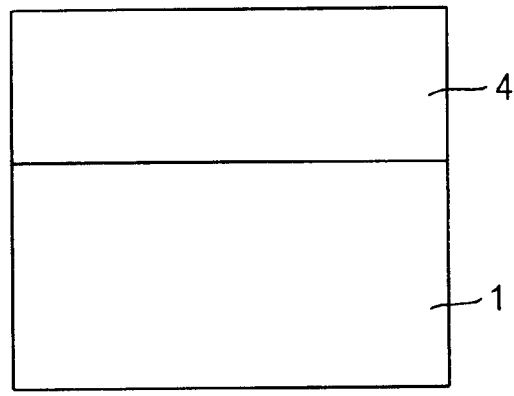
FIG. 4(b) shows that having coating layer of CoNiCrAlY and FIG. 4(c) shows that having coating layer of chromium carbide.
Figure 4C:
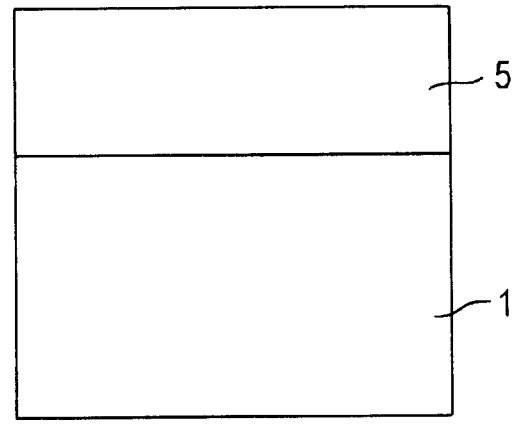

For the erosion test, in order to evaluate erosion characteristic due to particles, rotary type erosion test apparatus is employed, as shown in FIG. 3, and the test pieces are rotated in a tank where alumina of particle size of 1±0.1 mm is filled, wherein the test is done in the atmosphere, test temperature is 700° C., speed of rotation is 10 rpm and test time is 8 hours. After the test, depth of the coating thinned by the erosion test is measured for evaluation of erosion resistance. Results of the above-mentioned tests are shown in Table 3.

TABLE 3

| Sample Nos. | Coating material | Oxidation test results (Thinned depth) | Corrosion test results (Thinned depth) | Erosion test results (Thinned depth) |
|---|---|---|---|---|
| 1 (Invented coating) | 50% $Cr_3C_2$ + 50% CoNiCrAlY | 1.0 | 1.0 | 1.0 |
| | 25% $Cr_3C_2$ + 75% CoNiCrAlY | 0.9 | 1.0 | 1.8 |
| 2 (Prior art coating) | 75% $Cr_3C_2$ + 25% NiCr | 3.8 | 9.5 | 0.9 |
| 3 (Prior art coating) | CoNiCrAlY | 0.9 | 0.9 | 11.2 |

Thinned depth is relative value where the value of invented coating is 1.

From Table 3, the element having the corrosion resistant and erosion resistant coating layer of the present invention formed thereon is excellent apparently in the corrosion resistance and erosion resistance and the effect of the element having the corrosion resistant and erosion resistant coating layer of the present invention formed thereon has been proved. It is to be noted that while the LPPS method is employed for the spraying in the sample No. 1, it is clear that same effect can be obtained even if the spraying of the APS method or the HVOF method is employed.

As described above, the present invention provides a high temperature equipment having a coating layer formed thereon in which $Cr_3C_2$ is finely dispersed in MCrAlY.

In the prior art, for example, turbine moving/stationary blade of a gas turbine using fuel from a fluidized bed boiler has no such a coating as having both the corrosion/oxidation resistance and the erosion resistance but either one of said resistances is sacrificed and the turbine blade is of a short life.

On the other hand, the high temperature equipment of the present invention has the corrosion resistant and erosion resistant coating formed thereon in which $Cr_3C_2$ which is excellent in the erosion resistance is finely dispersed in the MCrAlY layer which is excellent in the corrosion/oxidation resistance, as mentioned above, so that both the corrosion/oxidation resistance and the erosion resistance are exhibited effectively at the same time.

Thus, the equipment having the corrosion resistant and erosion resistant coating layer of the present invention is applied to a gas turbine and the like, for example to a gas turbine operated by fuel from a pressurized fluidized bed boiler, thereby a high temperature portion (turbine moving/stationary blade, combustor, etc.) which stands a long time use in a very severe environment where both corrosion and erosion exist can be provided.

It is understood that the invention is not limited to the particular construction and arrangement herein described and illustrated but embraces such modified forms thereof as come within the scope of the appended claims.

What is claimed is:

1. A high temperature equipment having a corrosion resistant and erosion resistant coating formed thereon, wherein said coating is composed of a coating layer consisting essentially of $Cr_3C_2$ dispersed in MCrAlY formed by a sprayed coating of a mixed powder of MCrAlY powder and $Cr_3C_2$ powder, wherein a weight ratio of MCrAlY/$Cr_3C_2$ in said coating layer is more than 1/1 to 3/1.

2. The high temperature equipment of claim 1, wherein the coating layer has a thickness of at least 0.2 mm.

3. A high temperature equipment having a corrosion resistant and erosion resistant coating formed thereon, wherein said coating is composed of a coating layer consisting of $Cr_3C_2$ dispersed in MCrAlY formed by a sprayed coating of a mixed powder of MCrAlY powder and $Cr_3C_2$ powder, wherein a weight ratio of MCrAlY/$Cr_3C_2$ in said coating layer is more than 1/1 to 3/1.

4. The high temperature equipment of claim 3, wherein the coating layer has a thickness of at least 0.2 mm.

* * * * *